(12) United States Patent
Han et al.

(10) Patent No.: US 12,503,052 B2
(45) Date of Patent: Dec. 23, 2025

(54) METHOD AND APPARATUS FOR GENERATING SURROUND VIEW MONITORING IMAGE FOR SHIP

(71) Applicant: AVIKUS CO., LTD., Seoul (KR)

(72) Inventors: Dae Yong Han, Seoul (KR); Hee Chan Jung, Seoul (KR); Seong Jong Jo, Seoul (KR)

(73) Assignee: Avikus Co., Ltd., Seoul (KR)

( * ) Notice: Subject to any disclaimer, the term of this patent is extended or adjusted under 35 U.S.C. 154(b) by 0 days.

(21) Appl. No.: 19/002,980

(22) Filed: Dec. 27, 2024

(65) Prior Publication Data

US 2025/0121774 A1   Apr. 17, 2025

Related U.S. Application Data

(63) Continuation of application No. PCT/KR2023/022033, filed on Dec. 29, 2023.

(30) Foreign Application Priority Data

Jan. 11, 2023 (KR) .......... 10-2023-0004038
Sep. 11, 2023 (KR) .......... 10-2023-0120648

(51) Int. Cl.
*B60R 1/27* (2022.01)
*G01S 17/89* (2020.01)
*G06T 5/50* (2006.01)

(52) U.S. Cl.
CPC .............. *B60R 1/27* (2022.01); *G01S 17/89* (2013.01); *G06T 5/50* (2013.01); *G06T 2207/20221* (2013.01)

(58) Field of Classification Search
CPC .. B60R 1/27; G01S 17/89; G06T 5/50; G06T 2207/20221
See application file for complete search history.

(56) References Cited

U.S. PATENT DOCUMENTS

| | | | |
|---|---|---|---|
| 2021/0004614 A1 | 1/2021 | Buerker | |
| 2023/0169872 A1* | 6/2023 | Son | ........................ B63B 79/00 701/468 |

FOREIGN PATENT DOCUMENTS

| | | |
|---|---|---|
| CN | 112634661 A | 4/2021 |
| EP | 3776485 B1 | 1/2022 |
| KR | 10-2018-0046803 A | 5/2018 |
| KR | 10-1885743 B1 | 9/2018 |
| KR | 10-2019-0105274 A | 9/2019 |
| KR | 10-2052013 B1 | 12/2019 |

(Continued)

OTHER PUBLICATIONS

International Search Report Dated Mar. 29, 2024.
Extended European Search Report Dated Sep. 10, 2025.

*Primary Examiner* — On S Mung
(74) *Attorney, Agent, or Firm* — Harvest IP Law, LLP

(57) ABSTRACT

The present disclosure relates to a method and an apparatus of generating a surround view monitoring (SVM) image. The method includes: obtaining installation information of an actual camera installed on a ship; setting a virtual camera to orient toward a ground plane perpendicularly within a world coordinate system; calculating a conversion relationship between the virtual camera and the actual camera, based on the installation information of the actual camera; generating the SVM image based on the calculated conversion relationship; and controlling the ship based on the generated SVM image.

19 Claims, 13 Drawing Sheets

(56) References Cited

FOREIGN PATENT DOCUMENTS

| KR | 10-2021-0108532 A | 9/2021 |
| KR | 10-2441052 B1 | 9/2022 |
| KR | 10-2455565 B1 | 10/2022 |

* cited by examiner

FIG. 11

```
Algorithm MAP_occupancy_grid_mapping(x_{1:t}, Z_{1:t}) :
    set m = { 0 }
    repeat until convergence
        for all cells m_i do
            m_i = argmax(l_0)^k + ∑ log
                  k=0.1           t
                    measurement_model(z_t, x_t, m with m_i = k )
        endfor
    endrepeat
    return m
```

METHOD AND APPARATUS FOR GENERATING SURROUND VIEW MONITORING IMAGE FOR SHIP

CROSS REFERENCE TO RELATED APPLICATION

This application is a continuation application of International Application No. PCT/KR2023/022033 filed on Dec. 29, 2023, which claims priority from Korea Patent Application No. 10-2023-0196379 filed on Dec. 29, 2023, the entire contents of which are incorporate herein for all purpose by this reference.

TECHNICAL FIELD

Embodiments relate to a method and apparatus for generating a surround view monitoring (SVM) image for a ship. More particularly, embodiments relate to a method and apparatus for calibrating a plurality of cameras using a virtual camera concept without pattern photographing, and generating an SVM image.

In addition, embodiments relate to a 3-dimensional (3D) monitoring apparatus and method for a leisure boat, and more particularly, to an apparatus and method capable of obtaining a distortion-free 3D SVM screen without a separate matching process by deforming an image by using camera installation information and a light detection and ranging (LiDAR) sensor.

BACKGROUND

Recently, monitoring systems using around view monitoring (AVM) and surround view monitoring (SVM) screens have been introduced to vehicles. This is a technology that installs cameras on front, rear, left, and right sides of a vehicle to photograph the front, rear, left, and right sides of the vehicle, and then combines such camera images to provide a top view.

In a prior art, Choi (KR 10-2441052) disclosed that pixels of a wide-angle image input from a camera are mapped to corresponding coordinates and images are combined based on valid pixels, thereby minimizing distortion such as image quality deterioration that occurs when the wide-angle image is converted into a narrow-angle image. Recently, attempts have been made to apply SVM images to ships to improve environments where continuous forward monitoring is not possible. However, it is difficult to apply SVM systems of vehicles to ships due to the differences between ships and vehicles.

When viewed from the top or above, a ship has a curved hull overall, with the front becoming narrower toward the head (bow), and its height above the waterline is not constant. Accordingly, compared to vehicles with a rectangular shape and a constant height from the ground, it is difficult to realize practical SVM screens for spindle-shaped ships because, even when images are obtained from cameras attached to same locations as vehicles and surrounding images are aligned, areas of highest risks, such as the bottom left and right of bow, are mostly hidden as blind spots.

In addition, ships do not have uniform shapes, and there is a large height difference between the installation locations of mounted cameras, whereas existing vehicle SVM is mostly installed at similar heights and similar locations (front, rear, below a left sideview mirror, and below a right sideview mirror), and thus camera installation locations specific to ships are not considered. Moreover, unlike vehicles that have elements that serve as mapping standards, such as lanes or crosswalks, it is very difficult for ships to simply map pre-set pixels in an image to corresponding coordinates.

Accordingly, it is difficult to apply a matching process for SVM image combination for vehicles to ships, and even if a camera matching process is performed before floating ships on the water, distortion remains significant when the SVM image combination is performed during sailing. This is because, unlike vehicles traveling on a static horizontal road, ships are rigid bodies maintained above fluid by buoyancy, and thus, the centers of gravity and states of ships change before and after they are set afloat, and the bow is lifted depending on the speed of the ships.

In another prior art, Oh (KR 10-2052013) disclosed that, in order to apply SVM of a vehicle to a ship, images are combined based on an overlapping reference point using a boundary between the ship's hull and the water as a first reference line and a boundary between the water and the land as a second reference line.

However, Oh does not consider camera locations according to differences in shapes between vehicles and ships, and when there is an underwater object, such as a pole or a crane, between the boundaries, it is difficult to control the underwater object to be captured in an SVM image without distortion.

SUMMARY

A purpose of the present disclosure is to generate a real-time 2-dimensional (2D) or 3-dimensional (3D) surround view monitoring (SVM) image by matching and calibrating images obtained from a plurality of cameras with high accuracy, without pattern photographing, using the concept of a virtual camera.

Another purpose of the present disclosure is to provide a 3D monitoring apparatus and method for a leisure boat, which may obtain an SVM image without distortion caused by an underwater object by using a 3D projection plane having an irregular shape, which is deformed using a light detection and ranging (LiDAR) sensor and a camera installation location suitable for a ship.

Aspects of the present disclosure are not limited to those mentioned above, and other aspects and advantages of the present disclosure, which are not mentioned, will be understood from descriptions below and will become more apparent by embodiments of the present disclosure. In addition, the aspects and advantages of the present disclosure will be realized through means and combinations thereof in the claims.

According to an embodiment of the present disclosure, provided is a method of generating and applying a surround view monitoring (SVM) image, including: obtaining installation information of an actual camera installed on a ship; setting a virtual camera to orient toward a ground plane perpendicularly within a world coordinate system; calculating a conversion relationship between the virtual camera and the actual camera, based on the installation information of the actual camera; and generating the SVM image based on the calculated conversion relationship.

In the present disclosure, the generating of the SVM image may include: determining a 3-dimensional (3D) projection plane, based on a shape of the ship or the installation information of the actual camera; and generating the SVM image by projecting an image obtained from the actual camera onto the 3D projection plane.

In the present disclosure, the 3D projection plane may have an elliptical hemisphere form or hemispherical form with a semicylinder inserted at a center thereof.

In the present disclosure, the 3D projection plane may be an irregular projection plane in which at least one of a radius of a projection plane, a front-back length of a ship, a side length of a ship, a side ratio of a ship, and an inclination of a projection plane is adjustable a user input.

In the present disclosure, the actual camera may be installed with a posture inclined at an angle of 0 to 90 degrees relative to a direction perpendicular to the ground plane of a world coordinate system, and the generated SVM image may display a sea horizon in at least a portion thereof.

In the present disclosure, the actual camera may be a blind-view camera installed to photograph a blind sector located below a waist of a spindle-shaped ship, and the generating of the SVM image may include generating the SVM image, based on the conversion relationship between the blind-view camera and the virtual camera.

In the present disclosure, the installation information of the actual camera may include an installation location, an installation height, and an installation posture, and in the present disclosure, a plurality of the actual cameras may be provided on the ship, and two or more of the plurality of actual cameras may have different installation heights and different installation postures.

In the present disclosure, the method may further include providing a user interface for displaying and adjusting the SVM image and the virtual camera, wherein the user interface may allow adjustment of display settings of the SVM image, according to a user input.

In the present disclosure, the display settings of the SVM image, which are adjustable according to the user input, may include a location and yaw, pitch, roll, and scale settings of the SVM image, and the SVM image may be changed in real time as the display settings are adjusted.

In the present disclosure, the method may further include providing a calibration setting adjustment interface for adjusting the conversion relationship between the virtual camera and the actual camera, wherein a pre-stored conversion relationship between the virtual camera and the actual camera is reset through the calibration adjustment interface based on a user input.

In the present disclosure, the method may further include: providing a plurality of the actual cameras installed on the ship; obtaining one or more point clouds by transmitting a signal to a surrounding area of the ship and receiving a reflected signal using a light detection and ranging (LiDAR) sensor; generating, in real time, a 3D projection plane having an irregular shape for the surrounding area of the ship set using the installation information of each of the plurality of the actual cameras and depth information of an object obtained by the LiDAR sensor; and performing image fusion by projecting images of the plurality of cameras from a viewpoint of the virtual camera located on a top of the ship.

In the present disclosure, the method may further include dynamically updating the 3D projection plane based on artificial intelligence or the depth information of the object obtained by the LiDAR sensor.

According to another embodiment of the present disclosure, provided is an apparatus for generating a surround view monitoring (SVM) image, including: a plurality of actual cameras provided on a ship and configured to photograph a surrounding area of the ship, wherein at least two actual cameras of the plurality of actual cameras have different installation heights; and a processor configured to generate an SVM image from a plurality of images obtained from the plurality of actual cameras, by using a virtual camera that perpendicularly face a ground plane of a world coordinate system.

In the present disclosure, the processor may be further configured to: determine a 3-dimensional (3D) projection plane based on a shape of the ship or the installation heights of the plurality of actual cameras; and generate the SVM image by projecting the plurality of images onto the 3D projection plane.

In the present disclosure, the 3D projection plane may have an elliptical hemisphere form or a hemispherical form with a semicylinder inserted at a center thereof. Furthermore, the 3D projection plane may be an irregular projection plane in which at least one of a radius of a projection plane, a front-back length of a ship, a side length of a ship, a side ratio of a ship, and an inclination of a projection plane is adjustable by a user input.

In the present disclosure, each of the plurality of actual cameras may be installed with a posture inclined at an angle of 0 to 90 degrees relative to a direction perpendicular to the ground plane of the world coordinate system, and the generated SVM image may display a horizon in at least a portion thereof.

In the present disclosure, the processor may be further configured to provide a calibration adjustment interface for adjusting a conversion relationship between the virtual camera and the plurality of actual cameras. Furthermore, the plurality of actual cameras comprises a blind-view camera installed to photograph a blind sector located below a waist of a spindle-shaped ship. Additionally, the processor may be configured to generate the SVM image based on a conversion relationship between the blind-view camera and the virtual camera.

According to the above-described technical solutions of the present disclosure, a 3-dimensional (3D) surround view monitoring (SVM) image can be generated by calculating a conversion relationship between a virtual camera and actual cameras without pattern photographing.

According to an embodiment of the present disclosure, installation heights of SVM cameras installed on a ship can be determined differently, and installation locations and heights can be changed even after the installation.

According to an embodiment of the present disclosure, even when installation information of an actual camera is changed, an SVM image can be generated in real time without pattern photographing, and an operator or user can adjust a calibration setting value.

According to an embodiment of the present disclosure, by intentionally deforming a 3D projection plane, on which a captured image is projected, by using light detection and ranging (LiDAR) data obtained through a LIDAR sensor, image distortion can be prevented in a coastal area where many underwater objects are detected, in particular, in a berthing area.

According to an embodiment of the present disclosure, image matching can be performed by using camera installation location information without a separate camera matching process, and thus, camera installation for matching is facilitated.

Purposes of the present disclosure are not limited to those mentioned above, and other purposes that are not mentioned will be clearly understood by one of ordinary skill in the art from the following description.

BRIEF DESCRIPTION OF DRAWINGS

FIG. 11 is a diagram showing a maximum posterior probability estimation algorithm according to an embodiment of the present disclosure.

DETAILED DESCRIPTION

Figure 1:
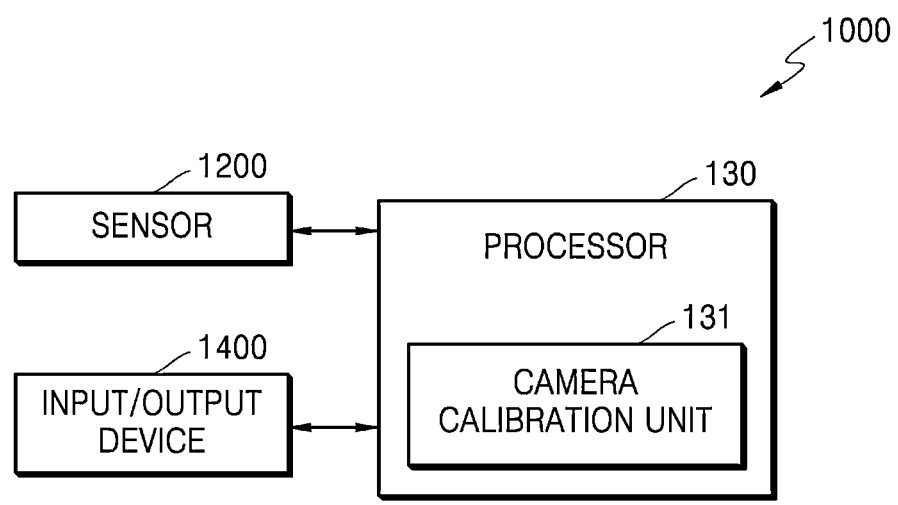
FIG. 1 is a block diagram of an apparatus for generating a surround view monitoring (SVM) image, according to an embodiment of the present disclosure.

Advantages and features of the present disclosure and methods of accomplishing the same may be understood more readily by reference to the following detailed description of the embodiments and the accompanying drawings. However, it should be understood that the present disclosure is not limited to the embodiments presented below, but may be implemented in various different forms, and include all transformations, equivalents, and substitutes included in the spirit and scope of the present disclosure.

Also, the terms used in the present specification are only used to describe specific embodiments, and are not intended to limit the present disclosure. An expression used in the singular encompasses the expression in the plural, unless it has a clearly different meaning in the context. In the present specification, it is to be understood that terms such as "including" or "having", etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Some embodiments of the present disclosure may be represented by functional block configurations and various processing operations. Some or all of these functional blocks may be implemented by various numbers of hardware and/or software configurations that perform particular functions. For example, the functional blocks of the present disclosure may be implemented by one or more microprocessors or by circuit configurations for a certain function. Also, for example, the functional blocks of the present disclosure may be implemented in various programming or scripting languages. The functional blocks may be implemented by algorithms executed in one or more processors. In addition, the present disclosure may employ general techniques for electronic environment setting, signal processing, and/or data processing. Terms such as "mechanism", "element", "means", and "configuration" may be used widely and are not limited as mechanical and physical configurations.

In addition, a connection line or a connection member between components shown in drawings is merely a functional connection and/or a physical or circuit connection. In an actual device, connections between components may be represented by various functional connections, physical connections, or circuit connections that are replaceable or added.

In addition, various changes may be made to some embodiments of the present disclosure, and thus, specific embodiments will be illustrated in drawings and described in detail in the detailed description. Effects and features of the embodiments and methods of achieving the same will become apparent with reference to details described in detail with reference to the drawings. However, the embodiments are not limited to those described below, and may be implemented in various forms.

In the following embodiments, the terms "first" and "second" are not used in a limited sense and are used to distinguish one component from another component. In the following embodiments, an expression used in the singular encompasses the expression of the plural, unless it has a clearly different meaning in the context. In the following embodiments, it will be further understood that the terms "comprise" and/or "comprising" used herein specify the presence of stated features or components, but do not preclude the presence or addition of one or more other features or components. In the following embodiments, when a part is "connected" to another part, the part may not only be "directly connected" to the other part, but may also be "electrically connected" to the other part with another element in between.

Hereinafter, embodiments will be described in detail with reference to the accompanying drawings, and in the following description with reference to the drawings, like reference numerals refer to like elements and redundant descriptions thereof will be omitted.

FIG. 1 is a block diagram of an apparatus for generating a surround view monitoring (SVM) image, according to an embodiment of the present disclosure.

As shown in FIG. 1, a ship monitoring device 1000 according to an embodiment of the present disclosure may include a sensor 1200, a processor 130, and an input/output device 1400.

First, the sensor 1200 is one or more sensors installed on a ship and may include one or more sensors from among a camera, radio detection and ranging (RADAR), light detection and ranging (LiDAR), a global positioning system (GPS), an automatic identification system (AIS), sound navigation ranging (SONAR), and an inertial measurement unit (IMU), but is not limited to the examples above.

According to an embodiment of the present disclosure, the processor 130 may obtain installation information of an actual camera provided on the ship, set a virtual camera, calculate a conversion relationship between the virtual camera and the actual camera, based on the installation information of the actual camera, and generate an SVM image based on the calculated conversion relationship. According to another embodiment, the processor 130 may generate the SVM image according to an embodiment of the present disclosure, generate an image by fusing information from a plurality of sensors, generate an occupancy grid map, and reconstruct an image. In this regard, the processor 130 may include a camera calibration unit 131. Detailed operations of the processor 130 will be described below.

The input/output device 1400 may include an input device that obtains a user input from the ship and an output device that outputs information to be provided to a user and the ship. For example, the input device may include a rudder controller, a steering wheel, a pedal, a joystick, a steering button, or a computing device including a touch screen interface, and the output device may include a visual output device such as a monitor or a head-up display, an auditory output device such as a speaker, an engine control unit, or a steering control unit, but examples thereof are not limited thereto.

Figure 2:
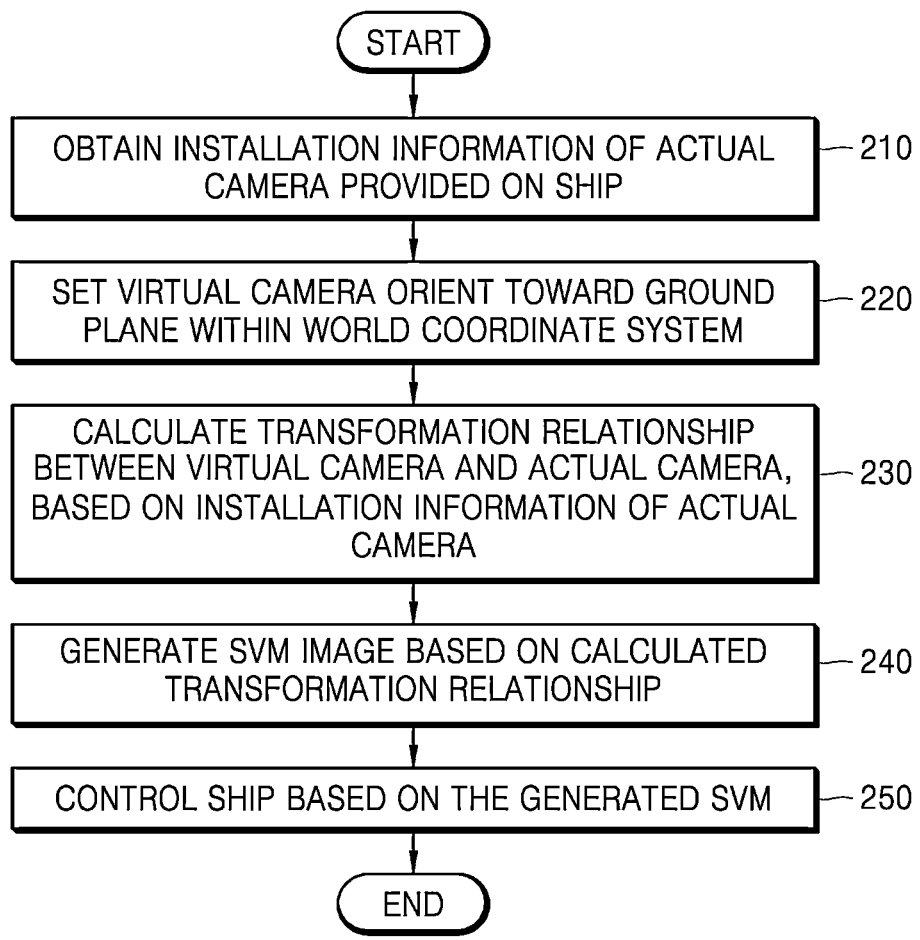
FIG. 2 is a flowchart of a method of generating an SVM image, according to an embodiment of the present disclosure.

FIG. 2 is a flowchart of a method of generating an SVM image, according to an embodiment of the present disclosure.

Referring to FIG. 2, first, a processor 130 obtains installation information of actual cameras installed on a ship (operation 210).

Then, the processor 130 sets a virtual camera oriented perpendicularly toward a ground plane of a world coordinate system (operation 220).

Then, the processor 130 calculates conversion relationships between the virtual camera and the actual cameras, based on the installation information of the actual cameras (operation 230).

Then, the processor 130 generates an SVM image based on the calculated conversion relationships (operation 240). the processor 130 may display generated SVM or may transmit the SVM image to a display device for displaying the SVM image.

Finally, the processor controls the ship based on the generated SVM (operation 250). That is, the processor 130 may control the navigation of a ship based on the generated SVM. The control may include adjusting the ship's course, speed, and navigation parameters, optimize a route of the ship, or maintain safe passage within predefined boundaries by sending a command to relevant devices, such as autopilot unit, a steering control unit, or engine control unit, of the ship.

In the following specification, in relation to the method of generating an SVM image, described in FIG. 2, an embodiment of generating the SVM image by performing calibration using a concept of the virtual camera, reconstructing the generated SVM image by using a LIDAR sensor, and generating an occupancy grid map will be described in further detail.

First, the camera calibration unit 131 may calculate the conversion relationship between actual cameras and the virtual camera, and may generate the SVM image by calibrating the virtual camera and/or the actual cameras based on the calculated conversion relationship. In contrast to the camera calibration unit 131, an image fusion unit 132, described below, may perform image fusion of generating a single 3-dimensional (3D) SVM image by combining and integrating image information obtained from a plurality of sensors (according to an embodiment of the present disclosure, a camera 111 and a LIDAR sensor 120).

In detail, the camera calibration unit 131 according to an embodiment of the present disclosure may generate the SVM image for monitoring a surrounding area of the ship.

Here, the SVM image is obtained by generating a top-view image by combining a plurality of images obtained from a plurality of cameras.

In this regard, there is an existing method for generating an SVM image of a vehicle. For example, to generate an SVM image of a vehicle, a specific pattern located around the vehicle is photographed, a homography matrix is calculated based on matching feature points, and images are matched based on the calculated homography matrix. At this time, the specific pattern is typically a chessboard pattern and may have at least four feature points.

More specifically, a vehicle SVM image may be generated by installing a plurality of cameras and then performing a matching process through pattern photographing. The pattern photographing may be performed at an end-of-line of vehicle production. At the end-of-line of vehicle production, after assembling a vehicle and installing cameras, an operator may move the vehicle over a set pattern, fix a vehicle body, and use the cameras to photograph the pattern placed around the vehicle. Also, an SVM image may be generated by recognizing patterns between obtained camera images, extracting feature points, estimating a correlation value (homography matrix value) between the camera images, and performing matching between the images, based on the estimated correlation value. At this time, the correlation value between the camera images may be derived between adjacent cameras (cameras capable of photographing a same pattern). Also, the operator may fine-tune the SVM image through a screen on a diagnostic device.

In the above description, the homography matrix value, which refers to the correlation value between the camera images, defines a relationship between planar objects projected on the camera, and is used to match images from individual cameras and convert the same into a single SVM top-view image. In other words, when a pattern on a certain plane is photographed at a specific angle and the same pattern is photographed at another angle, a value for matching an object on these two planes may be referred to as the homography matrix value.

In such an existing image matching method, the homography matrix value is estimated after recognizing the pattern because defining the homography matrix value is an essential procedure to generate the top-view image, i.e., the SVM image, as if a vehicle is photographed from the top, by matching the plurality of camera images. Also, in order to estimate the homography matrix value, at least a certain number of matching pairs is required, and thus, the pattern photographing is an essential procedure.

However, in relation to the method of generating an SVM image of a ship, it is difficult to arrange a fixed pattern on the water around the ship, as can be done for a vehicle. In other words, the ship is unable to be located on a fixed floor like a vehicle, and it is difficult to arrange a specific pattern on the water in reality. In addition, even if camera calibration is performed at the time of ship building, when the ship is actually floated on the water, an angle formed by a camera with an actual water surface may change according to the ship's center of gravity, and thus, camera calibration using a pattern may lead to inaccurate results.

In this regard, existing technology uses a method of flying a drone above a ship to obtain actual top-view photographs, but space and cost for such operation are restricted.

Accordingly, the camera calibration unit 131 according to an embodiment of the present disclosure may calculate the conversion relationship between the virtual camera and the actual cameras, based on the installation location and posture information of the cameras installed on the ship, and generate the SVM image based on the calculated conversion relationship. In other words, according to an embodiment of the present disclosure, calibration between the virtual camera and the plurality of actual cameras is possible without pattern photographing of the virtual camera or drone photographing, and the SVM image may be generated based thereon.

Figure 3:
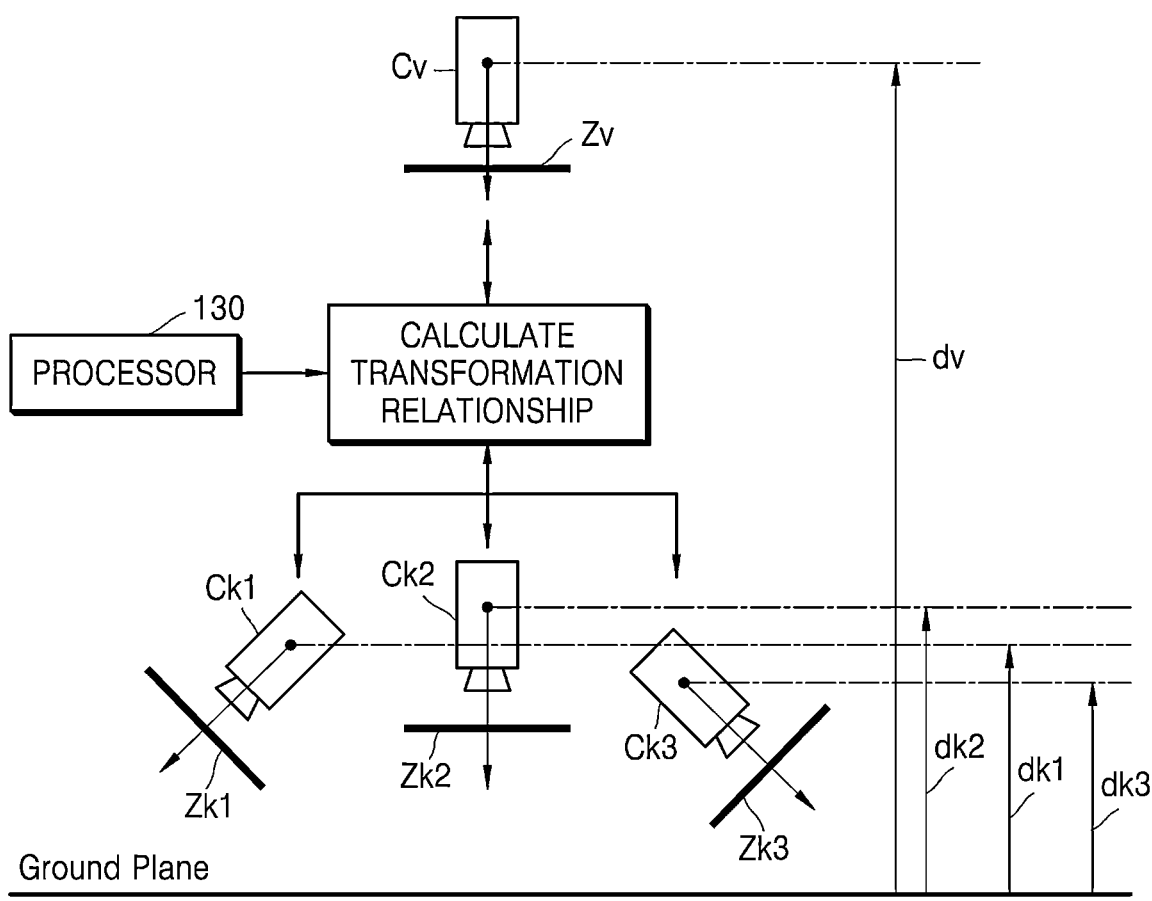
FIG. 3 is a diagram for describing a method of calculating a conversion relationship between a virtual camera and an actual camera, according to an embodiment of the present disclosure.

FIG. 3 is a diagram for describing a method of calculating a conversion relationship between a virtual camera and an actual camera, according to an embodiment of the present disclosure.

According to an embodiment of the present disclosure, first, the processor 130 may calculate a conversion relationship between a virtual camera Cv and installed actual cameras Ck1, Ck2, and Ck3 using a concept of the virtual camera Cv, in addition to the actual cameras Ck1, Ck2, and Ck3 installed on a ship. In other words, according to an embodiment of the present disclosure, calibration may be performed between the virtual camera Cv and the actual cameras Ck1, Ck2, and Ck3.

Referring to FIG. 3, the processor 130 may obtain installation information about the actual cameras Ck1, Ck2, and Ck3 and set the virtual camera Cv. In the embodiment of FIG. 3, only three actual cameras are illustrated, but according to another embodiment, it is obvious that the number of actual cameras may vary depending on a coverage range of a camera, and a shape and size of the ship. Hereinafter, a method of calculating the conversion relationship between the virtual camera Cv and the actual cameras Ck1, Ck2, and Ck3 will be described in more detail.

First, according to an embodiment of the present disclosure, the processor 130 may obtain the installation information of the actual cameras Ck1, Ck2, and Ck3 installed on the ship. In detail, the processor 130 may obtain, as the installation information, information about installation locations of the actual cameras Ck1, Ck2, and Ck3 on the ship, installation heights dk1, dk2, and dk3 thereof, and installation postures thereof for determining image planes Zk1, Zk2, and Zk3. Here, the processor 130 may obtain the installation information of the actual cameras Ck1, Ck2, and Ck3 from a database (DB) of the ship 140 or according to a user input. The installation information of the actual cameras Ck1, Ck2, and Ck3 stored in the DB of the ship 140 may be a value stored at the time of launching of the ship or initial installation of the actual cameras Ck1, Ck2, and Ck3, or may be a value pre-inputted by the user.

The processor 130 may set the virtual camera Cv that has a set height dv and posture oriented perpendicularly toward a ground plane (Z=0) of a world coordinate system. In other words, the processor 130 may set the posture of the virtual camera Cv such that the virtual camera Cv has an image plane Zv parallel to the ground plane of the world coordinate system. According to an embodiment of the present disclosure, the virtual camera Cv is a camera virtually set by the processor 130, unlike cameras that are actually installed, and thus, a location and posture thereof may be freely set.

According to an embodiment of the present disclosure, a generated 2D or 3D SVM image may be an image viewed from a viewpoint of the virtual camera Cv. Accordingly, it is possible to transform a principal point and a display range of the SVM image viewed from the viewpoint of the virtual camera Cv by changing the set location and posture of the virtual camera Cv. In other words, the virtual camera Cv has a posture oriented perpendicularly toward the ground plane when an initial conversion relationship is calculated, but after the conversion relationship is calculated, a height and posture may be freely changed to provide an SVM image that matches user settings.

The processor 130 may transform a plane imaged by the actual cameras Ck1, Ck2, and Ck3 to make it align with Z=0 in the world coordinate system, wherein Z represents Z-axis of the world coordinate system. In other words, the actual cameras Ck1, Ck2, and Ck3 have different installation postures, and thus, the individual image planes Zk1, Zk2, and Zk3 may also be different, and the processor 130 according to an embodiment of the present disclosure may convert the plane imaged by the actual cameras such that Z=0. In this case, any point (or pattern) photographed by each of the actual cameras Ck1, Ck2, and Ck3 may be a point that is present on Z=0.

The virtual camera Cv set by the processor 130 faces the ground plane perpendicularly, and thus, any point (or pattern) present on the ground plane may be transmitted to the virtual camera Cv with only a change in scale. Meanwhile, as described above, the processor 130 pre-obtains the installation information of the actual cameras (installation locations, installation heights, and installation postures on the ship, in particular, a mounting location, a mounting angle, and a mounting height of a bracket), and thus, a distance between actual points (or patterns) may be calculated. Accordingly, the processor 130 may match points (or patterns) on a 2D or 3D ground plane photographed by the virtual camera, based on the calculated distance between the actual points (or patterns). The processor 130 may calculate a conversion relationship between the virtual camera Cv and each of the actual cameras Ck1, Ck2, and Ck3, based on the matched points (or patterns). In the embodiment of FIG. 3, the conversion relationships between the virtual camera Cv and the actual cameras are calculated separately, and thus, three conversion relationships may be calculated.

In detail, a location, an angle, and a focal length of the virtual camera for generating an SVM image may be freely specified, and thus, the location, the angle, and the focal length of the virtual camera may already be known values. In addition, the focal length of the virtual camera is directly proportional to a screen magnification, and thus, a magnification conversion relationship and a posture conversion relationship between images of the actual camera and the virtual camera may be estimated based on the installation height and a camera installation posture value of the actual camera, without having to separately photograph a pattern or capture an image using a drone or the like. In other words, the processor 130 may generate an SVM image based on an installation angle and installation posture value of the actual camera, without pattern or drone photographing.

In a same manner as described above, according to an embodiment of the present disclosure, the conversion relationship between the virtual camera and the actual camera may be calculated using the concept of the virtual camera even without the drone photographing or pattern photographing, and the calculated conversion relationship may be used to generate an SVM image from an image obtained from the actual camera.

In other words, when calculating the conversion relationship, the processor 130 calculates the conversion relationship based on the assumption that the virtual camera faces a virtual point on a ground plane at a virtually specified angle, and thus, an SVM image may be generated as if the virtual camera faces the virtual point by using only the installation information of the actual camera without a feature point from the pattern photographing. Thus, according to an embodiment of the present disclosure, an SVM image obtained by calibrating a plurality of cameras may be generated by estimating the conversion relationship between the virtual camera and the actual camera (for example, a homography matrix value H) using a simple equation, without pattern photographing.

Figure 4:
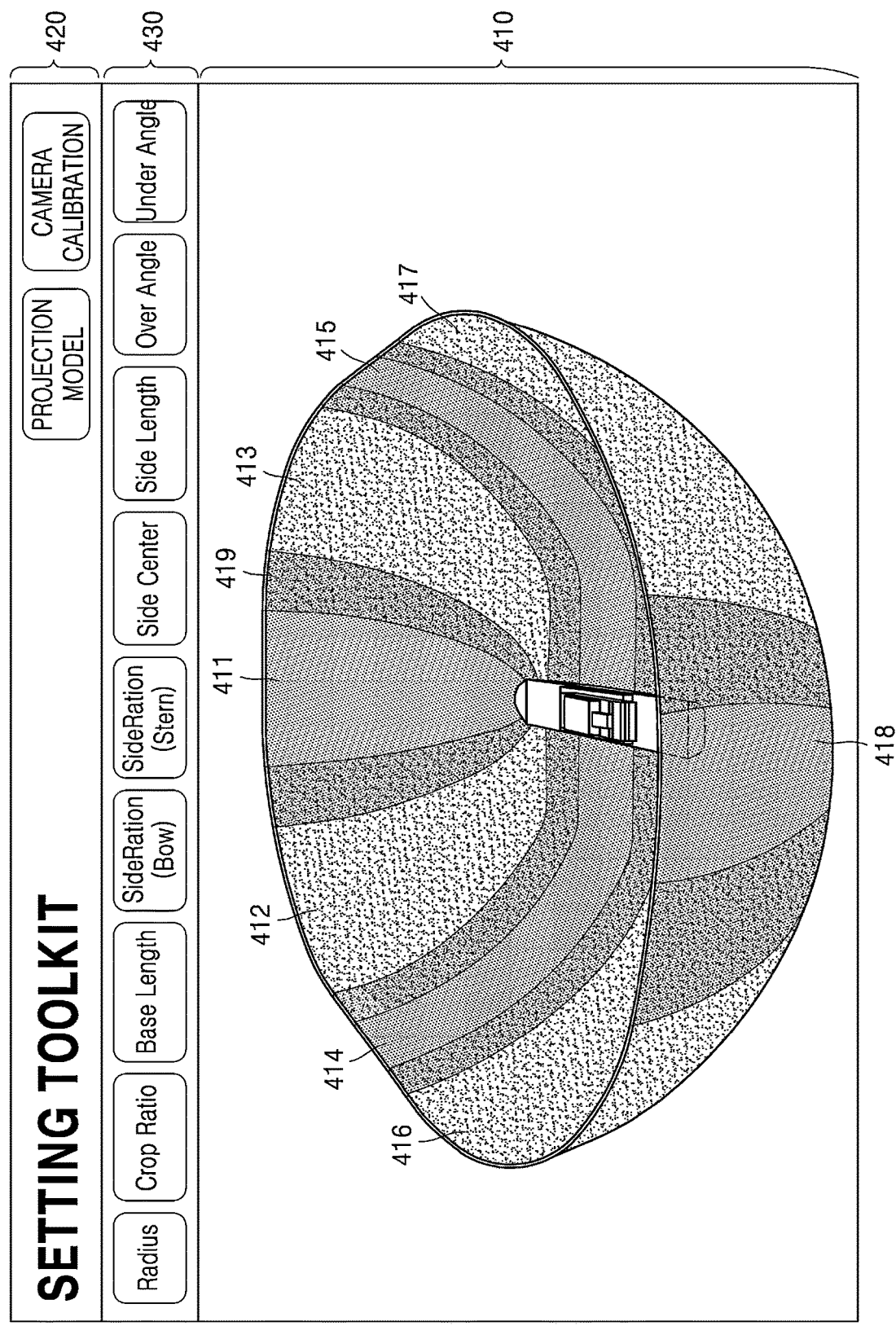
FIG. 4 illustrates an example of a 3-dimensional (3D) projection plane and a projection plane editing screen, according to an embodiment of the present disclosure.

FIG. 4 illustrates an example of a 3D projection plane and a projection plane editing screen, according to an embodiment of the present disclosure.

FIG. 4 illustrates an example of a user interface providing a projection plane screen 410, a setting menu 420, and a projection plane editing menu 430, according to an embodiment of the present disclosure. Referring to FIG. 4, the projection plane screen 410 displays a 3D projection plane on which images obtained by SVM cameras installed on a ship may be projected.

An existing SVM image for a vehicle is generated by projecting and matching a plurality of captured images onto a hemispherical projection plane, based on a homography value calculated through pattern photographing. A vehicle has a small aspect ratio, and thus, it is possible to generate an SVM image that covers almost all angles around the vehicle with only four cameras: front, back, left, and right, and even if a hemispherical projection plane is applied, distortion of a photographed object may be low. However, a ship has a large aspect ratio compared to a vehicle, and considering a coverage area of a camera, one or more SVM cameras need be installed on a side of the ship. Thus, when projecting a camera image onto a hemispherical projection plane such as that used on a ship, distortion of a photographed object may occur.

Thus, according to an embodiment of the present disclosure, the processor 130 may generate a 3D SVM image by projecting a plurality of obtained camera images onto an irregular 3D projection plane, based on conversion relationships between a plurality of cameras. In particular, according to an embodiment of the present disclosure, as illustrated by the projection plane screen 410 of FIG. 4, the 3D projection plane generated around the ship may have a hemispherical form with a semicylinder inserted into at a center of the hemispherical form. Alternatively, an embodiment is not limited thereto, and an elliptical hemisphere capable of effectively displaying a surrounding area of the ship may be the 3D projection plane of the present disclosure.

In more detail, as described above, the processor of the present disclosure may calculate the conversion relationship between the virtual camera and the actual camera image, so it determines the projection plane of the combined shape of a semicylinder and a hemisphere, and generate a 3D SVM image by placing and matching the actual camera images onto the projection plane. At this time, a shape of the 3D projection plane according to an embodiment may be determined based on a shape of the ship or installation information of the plurality of cameras. The shape of the ship or the installation information of the plurality of cameras may be obtained from the DB of the ship 140 or obtained according to a user input value. On the other hand, an existing method of generating an SVM image through pattern photographing only identifies a relationship between adjacent cameras, and thus, it is not possible to freely set a projection plane, and arrange and match images on the projection plane, as in an embodiment of the present disclosure.

In a specific embodiment, referring to FIG. 4, the 3D projection plane may be a 3D projection plane generated to project images generated by eight cameras installed on the ship S. Referring to FIG. 4, the 3D projection plane may include first to eighth areas 411 to 418, and the areas may respectively correspond to the eight cameras installed on the ship S. For example, the first area 411 may be an area where an image obtained from a bow camera of the ship is projected, the second and third areas 412 and 413 may be areas where images obtained from blind-view cameras installed to photograph blind sectors on left and right sides of the bow of the ship are projected, and the eighth area 418 may be an area where an image obtained from a stern-side camera of the ship is projected.

The projection plane on which the SVM image according to an embodiment of the present disclosure is projected may be set to include the horizon. In a case of an existing SVM image, it is impossible to generate an SVM image including the horizon when a camera is installed to face perpendicularly downward. However, according to an embodiment of the present disclosure, by setting installation postures such that actual cameras are oriented toward the floor at an oblique angle rather than perpendicularly, it is possible to generate a 3D projection plane in the form of hemisphere or elliptical hemisphere and include a horizontal plane to an image projected on the generated 3D projection plane. At this time, an angle of the actual camera being installed may be freely selected. According to an embodiment of the present disclosure, a camera installation angle may be set to 45 degrees considering a region of interest (ROI).

Also, according to an embodiment of the present disclosure, there may be an overlapping area between areas in the 3D projection plane. The overlapping area indicates an area where some photographing areas overlap each other depending on a coverage range of an installed camera, and for example, an overlapping area 419 may be present between the first area 411 and the third area 413. An image seamlessly stitched through calibration between cameras according to the conversion relationship described above may be displayed in the overlapping area, and when images are misaligned due to internal or external factor of the ship, a calibration setting may be changed through a user input.

Continuously referring to FIG. 4, according to an embodiment of the present disclosure, when the 3D projection plane screen 410 is provided, the setting menu 420 and the projection plane editing menu 430 may be additionally displayed. The setting menu 420 may include options for changing a projection plane view setting (PROJECTION MODEL) and a calibration setting menu (CAMERA CALIBRATION).

Also, the projection plane editing menu 430 may provide, as menus, items for editing a 3D projection plane displayed on the projection plane screen 410. As described above, according to an embodiment of the present disclosure, the processor 130 may generate an SVM image by projecting camera images onto an irregular 3D projection plane, and at this time, settings of a shape and inclination of the irregular 3D projection plane may be adjusted by a user input.

For example, a user may adjust a curvature or radius of a projection plane through a Radius item of the projection plane editing menu, remove a portion of the projection plane by adjusting a ratio of cropping an image through a Crop Ratio item, set a base length of the ship through a Base Length item, adjust a side ratio in front of the ship through a Side Ratio (Bow) item, adjust a side ratio at the rear of the ship through a Side Ratio (Stern) item, adjust a length of sides of the ship through a Side Center item, adjust a side length of the ship through a Side Length item, emphasize or reduce an upper portion of the ship by adjusting an inclination of the projection plane through an Over Angle item, and emphasize or reduce a lower portion of the ship by adjusting an inclination of the projection plane through an Under Angle item.

Figure 5:
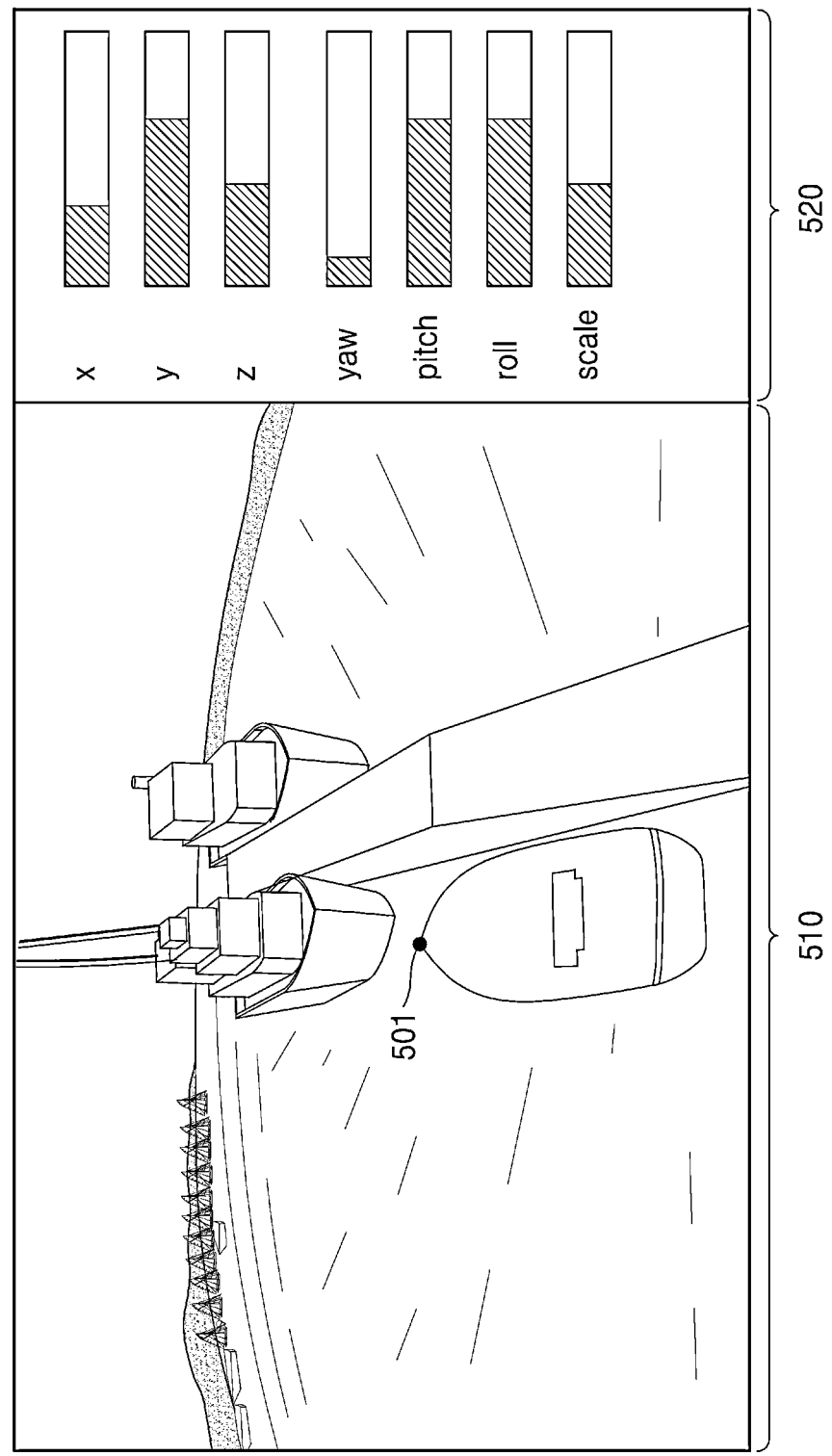
FIG. 5 illustrates an example of a user interface for displaying and adjusting an SVM image, according to an embodiment of the present disclosure.

FIG. 5 illustrates an example of a user interface for displaying and adjusting an SVM image, according to an embodiment of the present disclosure.

According to an embodiment of the present disclosure, the processor 130 may generate 2D and 3D SVM images in real time. In an existing method of performing matching between images by obtaining feature points through pattern photographing, once a transformation matrix (homography matrix) between images is determined, it is not possible to change the transformation matrix unless pattern photographing is performed again.

On the other hand, as described above, the present disclosure may calibrate a plurality of cameras using a concept of a virtual camera and generate an SVM image. In other words, according to an embodiment of the present disclosure, a conversion relationship between images of a virtual camera and an actual camera may be calculated by applying a concept of the virtual camera, and thus, even if an installation location or installation posture of a camera is changed, a new SVM image may be generated in real time as long as updated location and posture information are available.

The generated SVM image is a top-view SVM image in which the virtual camera located at the top of a ship looks down at the ship and its surroundings. In other words, an entire area of an SVM image projected on a 3D projection plane, as shown in FIG. 5, may be displayed as the SVM image of the virtual camera. In addition, according to an embodiment of the present disclosure, it is possible to adjust an area and principal point in the SVM image in real time. Thus, a user interface may be provided that reflects real-time adjustments to the camera's location and posture.

In a specific embodiment, the user interface of FIG. 5 for displaying and adjusting an SVM image may include an image display area 510 and an adjustment area 520. According to another embodiment, although not shown in FIG. 5, an interface for selecting an SVM camera desired to be adjusted may be additionally provided. The embodiment of FIG. 5 is an example in which a selected SVM camera is a bow camera 501 and an SVM image is displayed based on the bow camera 501. In particular, the SVM image displayed in the image display area 510 may be an SVM image that uses a specific point of an image captured by the bow camera 501 as a principal point.

In other words, according to another embodiment of the present disclosure, as shown in FIG. 5, a partial area, rather than the entire area, of the SVM image projected on the 3D projection plane may be displayed as the SVM image of the virtual camera. In this regard, the principal point and scale of the displayed SVM image may be changed by controlling an installation posture and scale of the virtual camera. In the specific embodiment of FIG. 5, a partial area of the 3D projection plane with a specific point in an area captured by a specific camera (bow camera) as the principal point is displayed in the image display area 510 as the SVM image of the virtual camera.

In this regard, according to an embodiment of the present disclosure, a camera may be installed to face an area of greatest interest as the ship sails. In other words, actual cameras may be installed such that principal points of cameras are directed toward points in areas of greatest interest during sailing, for example, a camera installed on the bow may be positioned to face at an angle of 45 degrees downward from the horizon.

However, there may be situations where a camera is unable to be installed to face a point desired by the user depending on a type of the ship, or where the user wants to change a principal point of an already installed camera at his/her discretion. In this case, according to an embodiment of the present disclosure, by adjusting a posture of the virtual camera according to a user input, a user interface that has a same effect as adjusting a posture and scale of an actual camera may be provided. To this end, according to an embodiment of the present disclosure, the user may adjust the SVM image by adjusting each parameter (x, y, z, yaw, pitch, roll, or scale) item in the image adjustment area 520.

Figure 6:
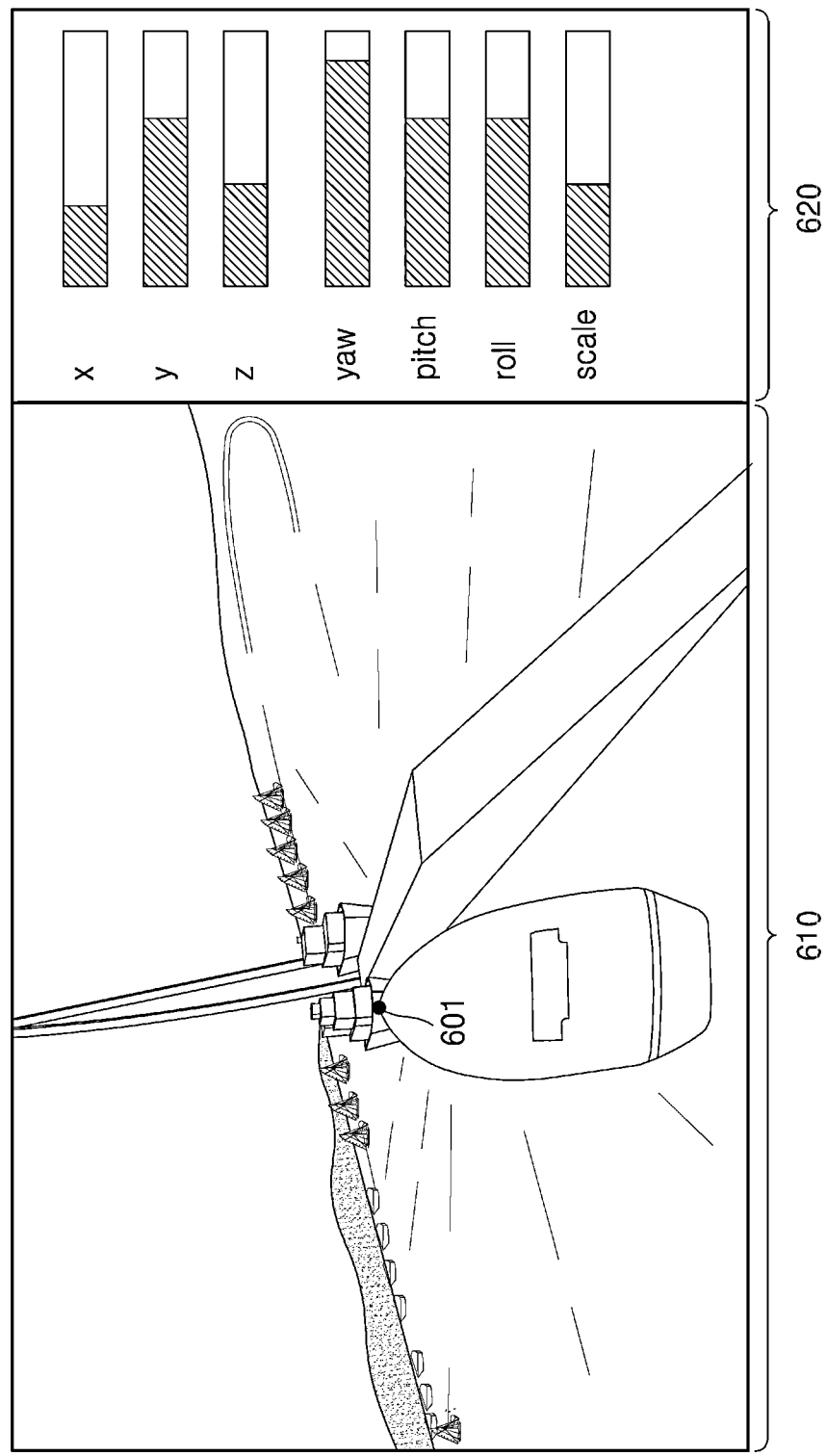
FIG. 6 illustrates an example of an SVM image adjusted by a user, according to an embodiment of the present disclosure.

FIG. 6 illustrates an example of an SVM image adjusted by a user, according to an embodiment of the present disclosure.

Referring to FIGS. 5 and 6, compared to FIG. 5, an SVM display area 610 in FIG. 6 displays an SVM image when a user adjusts yaw and scale values. Referring to an image adjustment area 620 of FIG. 6, like FIG. 5, the user may input x, y, z, yaw, pitch, roll, and scale values. An installation posture and scale of a virtual camera may be changed according to a user input in the image adjustment area 620. In the embodiment of FIG. 6, an SVM image, rotated by approximately 30 degrees in a yaw direction and scaled larger compared to FIG. 5 may be provided in the image display area 610. In other words, an image provided in the image display area 610 may be an image in which a roll value and a pitch value of a bow camera 601 are changed. In summary, according to an embodiment of the present disclosure, without having to change an installation posture of an actual camera, a scale and a principal point viewed by the virtual camera are changed with respect to an SVM image, in which images obtained by calibrating a plurality of cameras are projected on a 3D projection plane, and thus, a same effect as changing the installation posture and scale of the actual camera may be obtained.

According to an additional embodiment, the image adjustment areas 520 and 620 of FIGS. 5 and 6, respectively, may be provided for direct camera calibration by an operator or user. In detail, in the setting menu 420 of FIG. 4, the operator or user may directly perform calibration by selecting the calibration setting menu (CAMERA CALIBRATION).

In this regard, as described above, the processor 130 of the present disclosure may generate an SVM image by automatically calibrating cameras using only installation information of actual cameras based on the concept of a virtual camera. However, in order for the operator to fine-tune calibration settings when launching a ship or in order for the user to directly adjust the calibration settings in a situation where an actual camera is out of posture due to internal and external environments after the launching of the ship, a user interface for changing pre-stored calibration settings is required.

Accordingly, according to an embodiment of the present disclosure, a user interface for adjusting pre-stored conversion relationships between the virtual camera and the actual cameras, that is, calibration settings, may be additionally provided. The user interface for adjusting the calibration settings may be similar to the image display and adjustment interface of FIG. 5 or 6.

According to an embodiment, an error or misalignment in calibration may be mainly found in an overlapping area between camera images. For example, when the calibration is misaligned, images are not stitched correctly in the overlapping area 419 between the first area 411 and the third area 413 in FIG. 4 and are misaligned. In this case, the user may correct the misaligned calibration settings by directly adjusting location, yaw, pitch, roll, and scale settings of the image through the image adjustment interface. For example, the user or operator may view an SVM image in an interface environment such as FIG. 5 or 6 and adjust camera calibration misalignment, and the pre-stored conversion relationships between the virtual camera and the actual cameras may be reset by an input of the user or operator.

Figure 7:
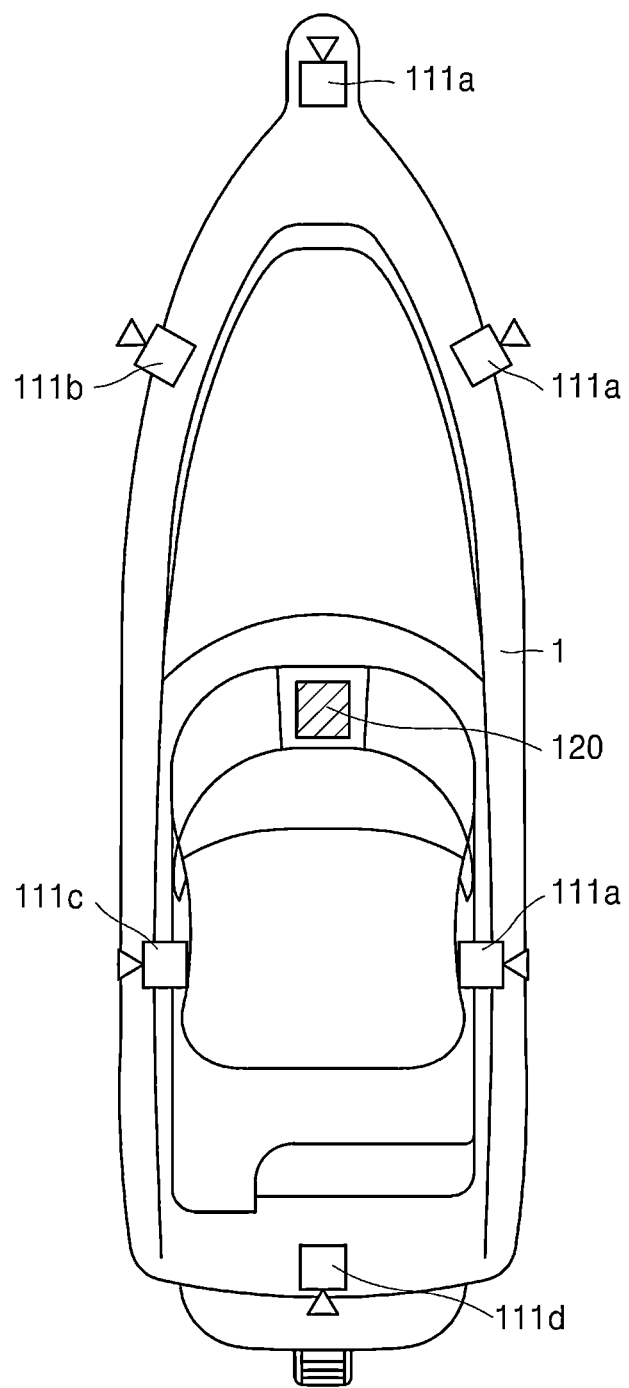
FIG. 7 is a diagram showing an example of a camera being installed on a ship, according to an embodiment of the present disclosure.
Figure 8:
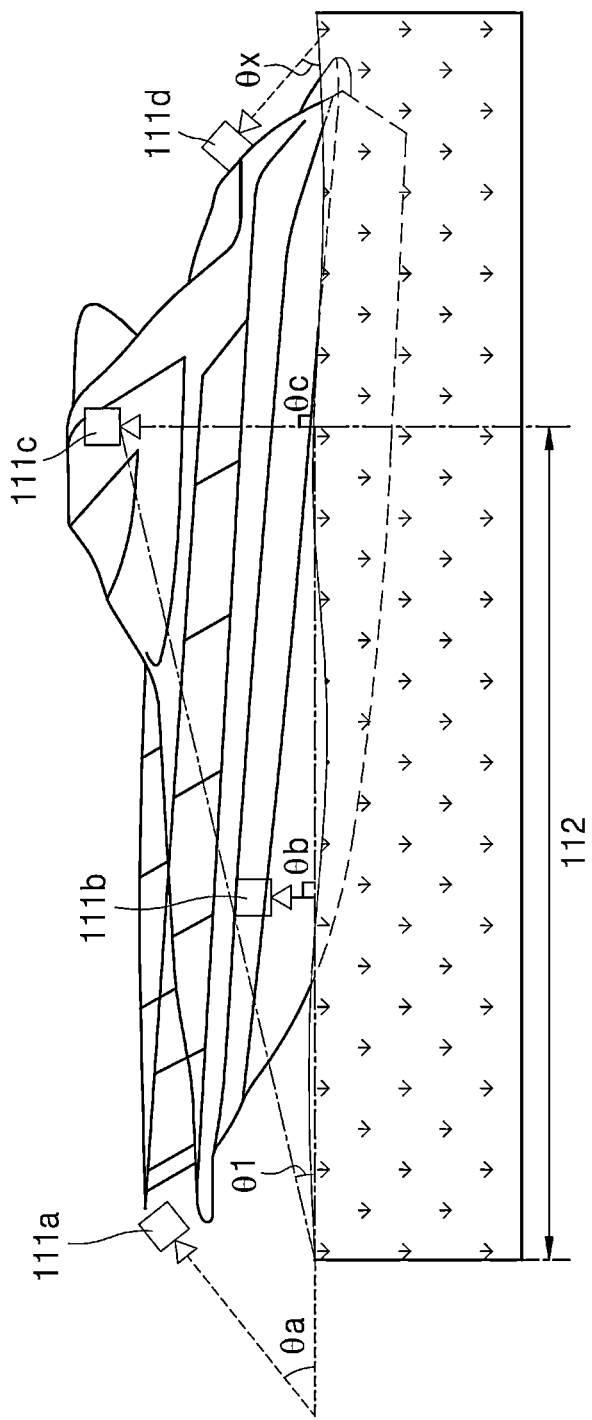
FIG. 8 is a diagram showing an example of the ship of FIG. 7 viewed from the side.

FIG. 7 is a diagram showing an example of a camera being installed on a ship, according to an embodiment of the present disclosure, and FIG. 8 is a diagram showing an example of the ship of FIG. 7 viewed from the side.

Although a ship 1 shown in FIGS. 7 and 8 is a leisure boat, embodiments of the present disclosure are not limited thereto and may be applied to any form, size, and type of ship. FIG. 7 illustrates a top view of a leisure boat, on which cameras 111a to 111d are installed, viewed from the top, and the FIG. 8 illustrates a side view of the leisure boat viewed from the side.

As shown in FIG. 7, according to an embodiment of the present disclosure, installation locations of the cameras 111a, 111b, 111c, and 111d may include at least the top of a cabin of the leisure boat, a bow of the leisure boat, a stern of the leisure boat, and a center portion of a line connecting the top of the cabin and the bow by projecting the top of the cabin and the bow on a surface of the sea.

First, in a case of the leisure boat shown in FIGS. 7 and 8, the camera 111a may be installed at a bow installation location. At this time, the camera 111a may be installed at an edge corner of the bow, ensuring that it is positioned to avoid capturing other obstacles in the image of the camera 111a. Here, the camera 111a installed on the bow may be positioned at an angle in a range of 0 to 90 degrees relative to a direction perpendicular to the water, preferably at 45 degrees, so as to capture the horizon.

The camera 111d may be installed at a stern-side installation location of the leisure boat. At this time, the camera 111d may be installed at a location corresponding to a high point of the stern and may be positioned such that no obstacles are located below its installation height. Like the camera 111a installed at the bow, the camera 111d installed at the stern may be positioned at an angle in a range of 0 to 90 degrees, preferably at 45 degrees, so as to capture the horizon.

The camera may be installed at a side location 111c of the leisure boat. At this time, the required number of cameras 111c installed at the side locations may be determined according to installation heights of the cameras and a camera angle of view. According to an embodiment, a coverage area of the camera 111c installed at the side location may be set to 4.5 times the camera installation height, and the installation location may be determined such that the coverage areas of the cameras 111c minimize a blind sector. Likewise, the camera 111c installed on the side may be installed at an angle in a range of 0 to 90 degrees in the direction of the water, preferably at 45 degrees.

According to an additional embodiment, the blind-view camera 111b capable of photographing a blind sector of the leisure boat may be installed on both the left and right sides below a curve of the bow. Ships have long bows, and thus blind sectors are easily formed at the bows. In addition, unlike vehicles that have brakes and can stop quickly, ships do not have brakes. Thus, considering that there is a greater possibility that a ship may sink due to an impact applied to a hull during a collision, it is important to generate an accurate SVM image without a blind sector.

However, because ships are much larger than vehicles, blind spots are also large, and in particular, collisions in blind spots may occur frequently due to characteristics of ships, which have spindle shapes at the bottoms. Accordingly, in the case of a ship having a spindle-shaped or bell-shaped bottom portion, installing a camera only on a deck of the ship may create a blind sector, resulting in a high possibility of a collision occurring in the blind sector.

Thus, according to an embodiment of the present disclosure, the camera 111b may be installed below the curve of the blind sector to photograph the blind sector. Meanwhile, the camera 111b installed below the curve, according to an embodiment, does not need to face the horizon because the camera installed at the bow described above is already photographing the horizon, and may be installed to perpendicularly face the water surface.

In detail, as shown in FIG. 8, the blind-view camera 111b may be installed at the center portion of a projected line 112, which is created by projecting the top of the cabin and the bow onto the surface of the sea and connecting these projected points. Accordingly, the top of the cabin and the bow may be perpendicularly connected to the horizontal plane by using drawing information stored in the DB of the ship 140, the projected straight line 112 connecting points in contact with the horizontal plane may be set, and both ends of the projected line 112 may be connected to the top of cabin, thereby forming a triangle. The camera 111b may then be installed at a point where a vertical line intersects the hypotenuse of the triangle, at the midpoint of projected line 112.

According to an embodiment of the present disclosure, installation heights of cameras installed on the ship may be different as shown in FIG. 8, and an SVM image of the leisure boat may be generated by calibrating the cameras with different installation heights.

In this regard, according to an existing method of generating an SVM image through pattern photographing, a plurality of cameras need to be installed at a same height, and it is not possible to change a location or a height of a camera once the camera is installed. On the other hand, according to an embodiment of the present disclosure, an SVM image is generated using a virtual camera, and thus locations and heights of actual cameras may be freely set. In other words, according to the present disclosure, by determining the installation locations of the cameras 111a, 111b, 111c, and 111d, a blind spot occurred during approaching/berthing may be minimized even for a ship of any shape, and information about surrounding situation recognition may be provided.

As an additional embodiment, installation information of an image capturing unit 110, that is, an installation posture and an installation location including an installation height, may be stored in the DB of the ship 140. An installation location of the camera 111 may be obtained using a drawing of the ship input from the DB of the ship 140, and an installation posture of the camera 111 may be obtained through a manual input of the user or from the DB of the ship 140 stored through an input of the user.

According to another embodiment, the installation posture of the camera 111 may be obtained by extracting a horizontal plane from an image obtained by the image capturing unit 110 and calculating an angle of the camera 111 with respect to the horizontal plane.

Figure 9:
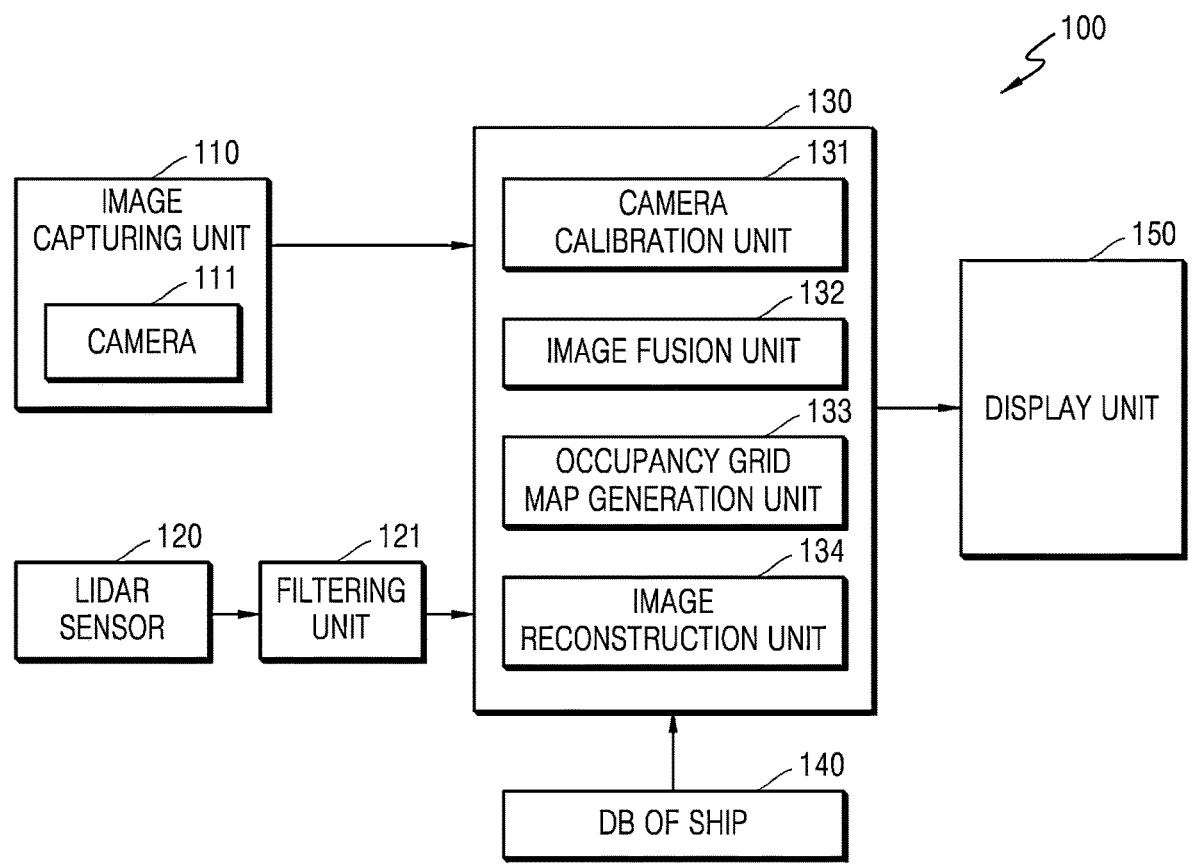
FIG. 9 is a block diagram of an apparatus for generating an SVM image, according to another embodiment of the present disclosure.

FIG. 9 is a block diagram of an apparatus for generating an SVM image, according to another embodiment of the present disclosure.

FIG. 9 is a modified example of FIG. 1, and redundant description will be omitted. As shown in FIG. 9, a ship monitoring device or an apparatus 100 for generating an SVM image, according to an embodiment of the present disclosure, may include the image capturing unit 110 including the plurality of cameras 111 installed on a ship and photographing a surrounding area of the ship, the LiDAR sensor 120 obtaining one or more point clouds by transmitting a signal to a surrounding area of the ship and receiving a reflected signal, and the processor 130 generating an SVM image by projecting, in a viewpoint of a virtual camera located at the top of the ship, an image of the image capturing unit 110 on an irregular 3D projection plane about the surrounding area of the ship, which is set by using installation information of the image capturing unit 110 and LIDAR data obtained by the LiDAR sensor 120. Blocks of FIGS. 1 and 9 are divided conceptually to facilitate the description of the present disclosure, and interpretation of embodiments of the present disclosure is not limited to the division of the blocks.

The processor 130 according to an embodiment of the present disclosure may include, in addition to the camera calibration unit 131 described above, the image fusion unit 132 projecting an image on the pre-set 3D projection plane of the surrounding area of the ship, according to distance information obtained by the LiDAR sensor 120 and the installation information of the image capturing unit 110.

In addition, the processor 130 may include an image reconstruction unit 134 deforming a 3D projection plane corresponding to a point of the image, where an object is identified, by using information about the length of the object, obtained by the LIDAR sensor 120, and stitching the image.

In addition, the processor 130 according to an embodiment of the present disclosure may further include an occupancy grid map generation unit 133 generating an occupancy grid map obtained by displaying, on a 3D projection plane split into a plurality of lattices, a lattice with a detected object as an occupancy grid using the LiDAR data.

According to an embodiment, the ship 1 may be a ship of any shape and may particularly include a small ship such as a leisure boat.

According to an embodiment, installation information includes an installation location or installation posture of the camera 111 in the ship 1, wherein the installation location is a relative coordinate location of each camera 111 with a center of the ship 1 as the origin and the installation posture may include an angle at which the camera 111 is mounted or a direction in which the camera 111 faces.

According to an additional embodiment of the present disclosure, image stitching may be performed without having to perform a separate camera matching process before and after installation of the cameras 111a, 111b, 111c, and 111d, using the installation information of the image capturing unit 110 and the LiDAR data obtained by the LiDAR sensor 120. In this regard, as shown in FIG. 7, the LiDAR sensor 120 may be arranged at the center of the ship 1 or at the top of the cabin.

The image fusion unit 132 according to an embodiment of the present disclosure may project the image on the pre-set 3D projection plane of the surrounding area of the ship according to the distance information obtained by the LiDAR sensor 120 and the installation information of the image capturing unit 110, and the image reconstruction unit 134 may deform the 3D projection plane corresponding to the point of the image, where the object is identified, using the information about the length of the object, obtained by the LiDAR sensor 120. Image distortion may be prevented through intentional deformation and image stitching.

The reason distortion occurs in an SVM image of the prior art is because a camera image uses a 3D projection plane with a pre-set regular shape, such as a hemispherical projection plane, with the ship 1 located at a point of contact with the floor. When there is an object with a long length in a vertical direction around the ship 1, if a projection plane of a regular shape is used without considering the object, the object with the long length is projected on an SVM image in an unrealistically large size.

Thus, according to an embodiment of the present disclosure, the irregular 3D projection plane of the surrounding area of the ship may be intentionally deformed by using distance information between the ship 1 and an underwater object 2, obtained by the LiDAR sensor 120, or length information of the underwater object 2.

For example, when the distance information between the ship 1 and the underwater object 2, obtained by the LiDAR sensor 120, is mapped with an image of the underwater object 2, captured by the image capturing unit 110, and the image is projected on the 3D projection plane according to the distance information, i.e., when the 3D projection plane is deformed according to the distance information and the image is projected on the deformed 3D projection plane, a 3D SVM image without distortion may be obtained.

Alternatively, the image of the underwater object 2 may be projected onto the 3D projection plane, and a portion of the 3D projection plane, on which the image including the underwater object 2 is projected, may be deformed according to the length of the underwater object 2. This deformation, considering the presence of the underwater object 2 and the length of the underwater object 2 obtained by the LiDAR sensor 120, helps prevent distortion of the 3D SVM image caused by the underwater object 2.

According to an embodiment of the present disclosure, the image fusion unit 132 may three-dimensionally convert a 2D image according to the LiDAR data by applying calibration between the LiDAR sensor 120 and the image capturing unit 110, and fuse the image with the LiDAR data.

Data may be fused by matching a plane on which an image is projected with a virtual plane generated from 3D coordinates of LiDAR data. When the fused data is input to the occupancy grid map generation unit 133, the occupancy grid map generation unit 133 may divide the fused data into a plurality of lattices and display an area where the underwater object 2 is present as an occupancy grid.

Then, the image reconstruction unit 134 may deform a 3D projection plane corresponding to the lattice indicated by the occupancy grid and stitch an image projected on the 3D projection plane of an irregular shape.

Figure 10:
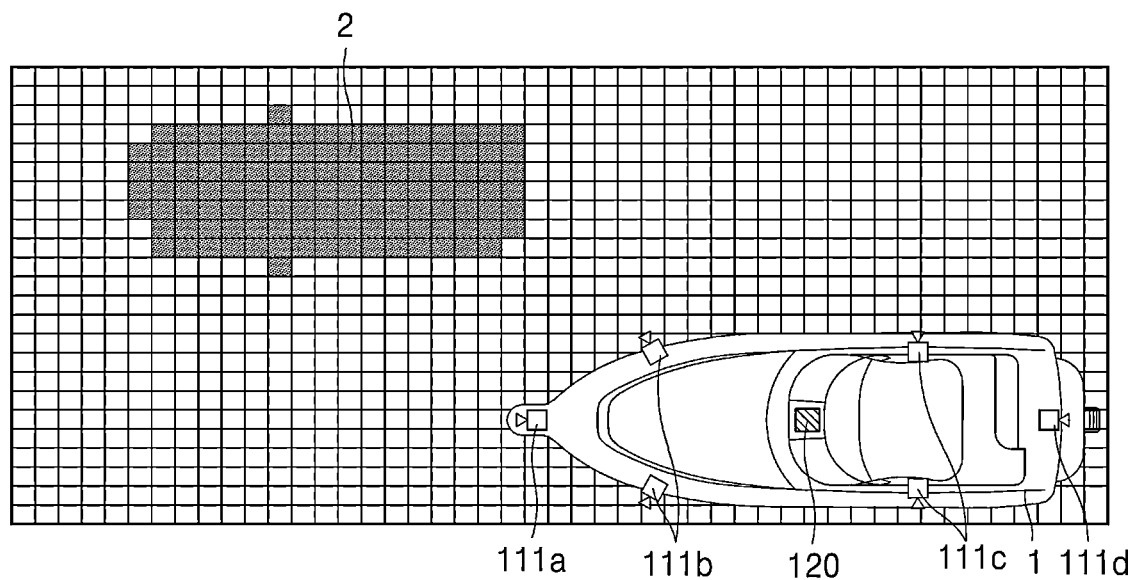
FIG. 10 is a conceptual diagram showing an occupancy grid map and a sensing range of a light detection and ranging (LiDAR) sensor, according to an embodiment of the present disclosure.
Figure 10:
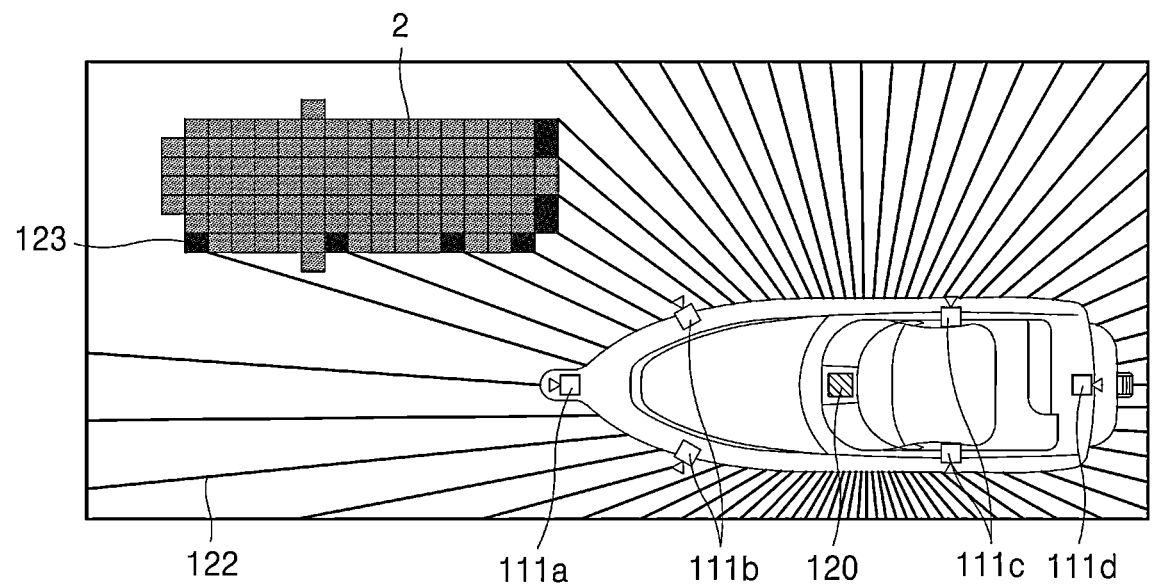

FIG. 10 illustrates a portion of a 3D projection plane before deformation is reflected and a LIDAR sensor range 122 where the LiDAR sensor 120 detects the underwater object 2, and as shown in FIG. 9, when an image is projected on the 3D projection plane based on the ship 1, the underwater object 2 located in the surrounding area of the ship may also be projected.

As shown in a lower diagram of FIG. 10, based on a detected object point 123 measured by the LiDAR sensor range 122, an area where the underwater object 2 is estimated to be present as shown in an upper diagram of FIG. 10 may be displayed as an occupancy grid, and deformation may be applied to a corresponding 3D projection plane.

At this time, the occupancy grid map generation unit 133 according to an embodiment of the present disclosure may generate an occupancy grid map using a maximum a posteriori estimation algorithm.

By using the detected object point 123, a robust occupancy grid map can be constructed that is resilient to noise caused by the relatively slow movement of the ship, as well as by waves, ripples, and the like. The occupancy grid map can then be used to estimate occupancy grids and apply deformation to the corresponding 3D projection plane based on the estimated occupancy grids.

Referring to FIG. 11, an optimization calculation for applying an occupancy grid map in real time may be performed by using LiDAR data obtained in real time from the LiDAR sensor 120 by performing a maximum a posteriori estimation algorithm.

According to an embodiment of the present disclosure, the processor 130 may further include a filtering unit 121 performing filtering on data obtained by the LiDAR sensor 120 by applying an intensity filter.

When a large amount of LiDAR data is used without separate filtering, a resolution may be too high, resulting in a waste of resources or memory of a computing device. Accordingly, for processing the large amount of LiDAR data, granularity may be changed such that only bearing angle actually applied on a ship may be processed.

For example, the resolution may be reduced by increasing density of the LIDAR data, which secures a 360-degree point cloud about a surrounding area of the ship, from 1 degree to 2 degrees.

Also, the ship 1 detects the underwater object 2 in an outdoor environment where there is sunlight or reflected light reflected from an object, and thus, in order to stably obtain LiDAR data in a strong lighting environment in the outdoor environment, the intensity filter may be applied. By filtering out information about areas with high distortion, data throughput may be reduced and stability may be improved.

A 3D SVM image may be quickly obtained through the above-described processes without a separate matching process, and the 3D SVM image may be displayed on a display unit 150.

The display unit 150 may be a multi-function display (MFD) device previously installed on the ship 1.

In addition, by installing a web computing device (not shown) capable of multi-platform transmission, the 3D SVM image may be transmitted not only to the MFD device of the ship 1 but also to a separate mobile device, thereby promoting user convenience.

The image capturing unit 110 may decompress an image obtained by the camera 111 and then perform image pre-processing to perform data fusion, stitching, and the like. Here, techniques that are well known to one of ordinary skill in the art may be applied.

Accordingly, image stitching may be performed without separate camera matching even on a ship that is unable to pre-photograph a pattern that may serve as a standard as in a vehicle, and as shown in FIG. 3, a 3D SVM image may be obtained even while horizontal levels of a bow and a stern continuously change during sailing. Intuitive information about surroundings of the ship may be provided to a powerboat driver, and thus convenience and safety of the driver may be increased.

Figure 12:
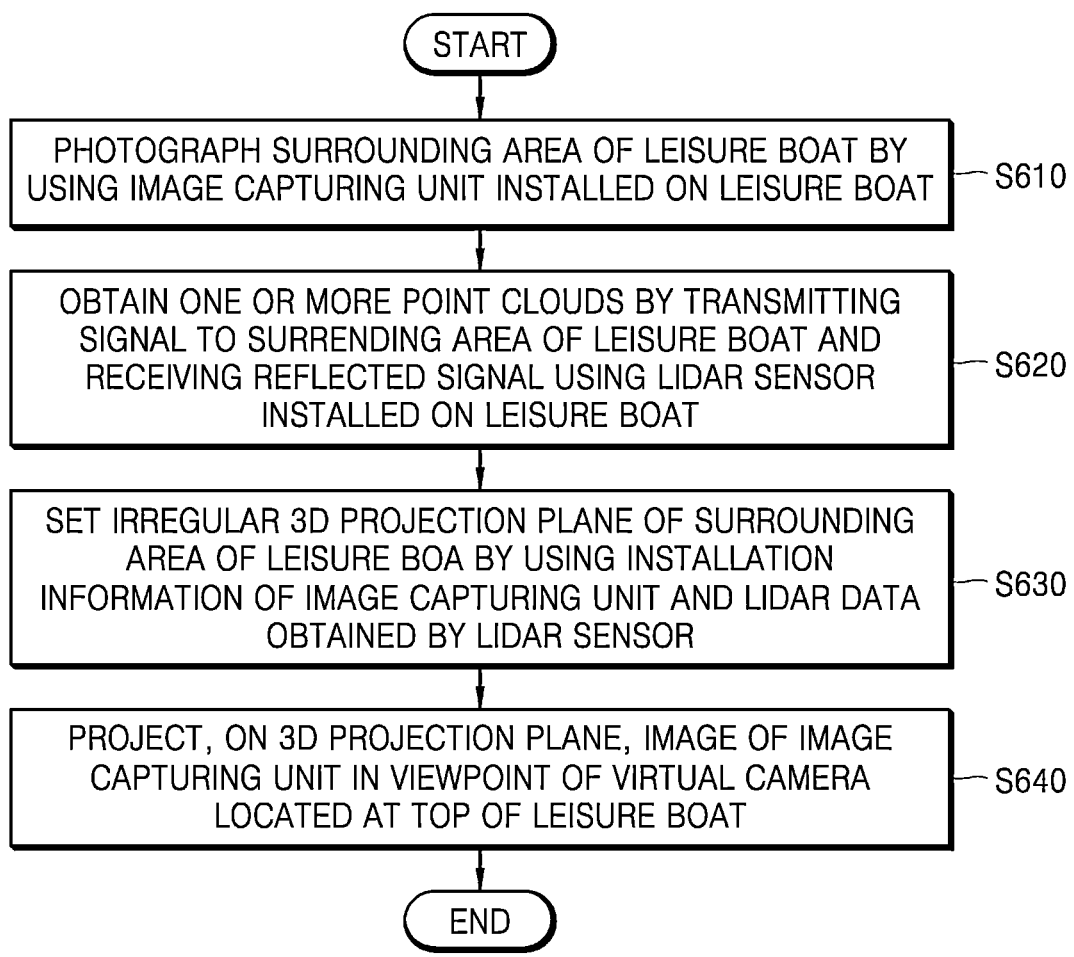
FIG. 12 is a flowchart of a 3D monitoring method for a ship, according to an embodiment of the present disclosure.

Meanwhile, as shown in FIG. 12, a ship 3D monitoring method according to an embodiment of the present disclosure may include photographing a surrounding area of a leisure boat using the image capturing unit 110 (shown in FIG. 9) installed on the leisure boat (operation S610), obtaining one or more point clouds by transmitting a signal to a surrounding area of the leisure boat and receiving a reflected signal using the LIDAR sensor 120 (shown in FIG. 9) installed on the leisure boat (operation S620), setting an irregular 3D projection plane of the surrounding area of the ship using installation information of the image capturing unit 110 and LiDAR data obtained by the LiDAR sensor 120 (operation S630), and projecting, on the 3D projection plane, an image of the image capturing unit 110 in a viewpoint of a virtual camera located at the top the leisure boat (operation S640).

Operations S630 and S640 according to an embodiment of the present disclosure may include projecting the image on a pre-set 3D projection plane of the surrounding area of the ship, according to distance information obtained by the LiDAR sensor 120 and the installation information of the image capturing unit 110, and deforming a 3D projection plane corresponding to a point of the image, where an object is identified, by using information about a length of the object, obtained by the LiDAR sensor 120, and stitching the image.

According to an embodiment of the present disclosure, the ship 3D monitoring method may further include generating an occupancy grid map obtained by displaying, on the 3D projection plane split into a plurality of lattices, a lattice with a detected object as an occupancy grid by using the LiDAR data. In addition, in operation S640, the lattice displayed as the occupancy grid may be deformed and the image may be stitched.

The generating of the occupancy grid map, according to an embodiment of the present disclosure, may include generating the occupancy grid map by using a maximum a posteriori estimation algorithm. Details that overlap those described above are omitted.

Figure 13:
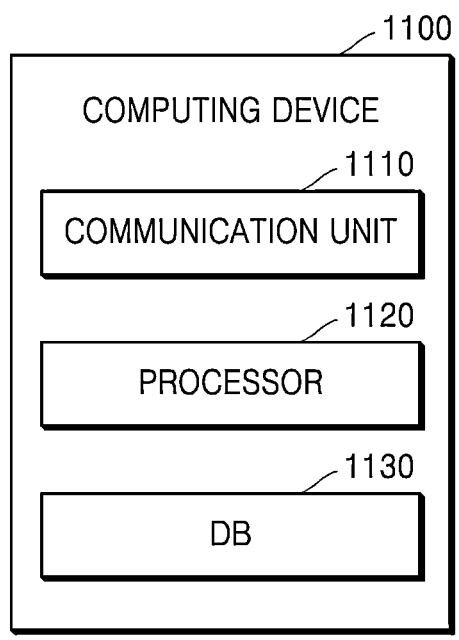
FIG. 13 illustrates a computing device according to an embodiment of the present disclosure.

FIG. 13 illustrates a computing device according to an embodiment.

A server 1100 of FIG. 13 may include a communication unit 1110, a processor 1120, and a DB 1130. Here, the processor 1120 may physically or conceptually include the processor 130 of FIG. 1 or the processor 130 of FIG. 9, and the DB 1130 may include the DB of the ship 140. Only components related to an embodiment are shown in the computing device 1100 of FIG. 13. Accordingly, it would be obvious to one of ordinary skill in the art that the server 1100 may further include general-purpose components other than the components shown in FIG. 13.

The communication unit 1110 may include one or more components enabling wired/wireless communication with other nodes. For example, the communication unit 1110 may include a short-range wireless communication unit (not shown), a mobile communication unit (not shown), and a broadcast receiving unit (not shown).

The DB 1130 is hardware storing various types of data processed in the computing device 1100, and may store a program for processes and control by the processor 1120. The DB 1130 may store ship information, camera installation information, and the like.

The DB 1130 may include random access memory (RAM) such as dynamic random access memory (DRAM) or static random access memory (SRAM), read-only memory (ROM), electrically erasable programmable read-only memory (EEPROM), CD-ROM, Blu-ray or another optical disk storage, hard disk drive (HDD), solid state drive (SSD), or flash memory.

The processor 1120 controls overall operations of the computing device 1100. For example, the processor 1120 may execute programs stored in the DB 1130 to control an input unit (not shown), a display (not shown), the communication unit 1110, and the DB 1130, in general. The processor 1120 may execute the programs stored in the DB 1130 to control operations of the computing device 1100.

The processor 1120 may be realized by using at least one of an application-specific integrated circuit (ASIC), a digital signal processor (DSP), a digital signal processing device (DSPD), a programmable logic device (PLD), a field programmable gate array (FPGA), a controller, a micro-controller, a microprocessor, and electric units for performing other functions.

The embodiments according to the present disclosure may be implemented in a form of a computer program executable by various components on a computer, and such a computer program may be recorded in a computer-readable medium. Here, the computer-readable medium may include hardware devices specially designed to store and execute program instructions, such as magnetic media, such as a hard disk, a floppy disk, and a magnetic tape, optical recording media, such as CD-ROM and DVD, magneto-optical media such as a floptical disk, and read-only memory (ROM), random-access memory (RAM), and a flash memory.

The computer program may be specially designed for the present disclosure or well known to one of ordinary skill in the computer software field. Examples of the computer program include not only machine codes generated by a compiler, but also high-level language codes executable by a computer by using an interpreter or the like.

According to an embodiment, a method according to various embodiments of the present disclosure may be provided by being included in a computer program product. The computer program products are products that can be traded between sellers and buyers. The computer program product may be distributed in a form of machine-readable storage medium (for example, a compact disc read-only memory (CD-ROM)), or distributed through an application store (for example, Play Store™) or directly or online between two user devices (for example, download or upload). In the case of online distribution, at least a part of the computer program product may be at least temporarily stored or temporarily generated in the machine-readable storage medium such as a server of a manufacturer, a server of an application store, or a memory of a relay server.

What is claimed is:

1. A method of generating and applying a surround view monitoring (SVM) image, the method comprising:
   obtaining installation information of a plurality of actual cameras installed on a ship, wherein at least two of the plurality of actual cameras generates non-overlapping images;
   setting a virtual camera to orient toward a ground plane perpendicularly within a world coordinate system;
   calculating a conversion relationship between the virtual camera and each of the plurality of actual cameras, based on the installation information of the plurality of actual cameras;
   generating the SVM image based on the calculated conversion relationship; and
   controlling the ship based on the generated SVM image,
   wherein the conversion relationship is calculated based on a distance between points in image acquired from each of the plurality of actual cameras,
   wherein the distance is generated based on the installation information composing an installation location, an installation height, and an installation posture.

2. The method of claim 1, wherein the generating of the SVM image comprises:
   determining a 3-dimensional (3D) projection plane, based on a shape of the ship or the installation information of the plurality of actual cameras; and
   generating the SVM image, which is a 3D image, by projecting the image onto the 3D projection plane.

3. The method of claim 2, wherein the 3D projection plane has an elliptical hemisphere form or a hemispherical form with a semicylinder inserted at a center thereof.

4. The method of claim 2, wherein the 3D projection plane is an irregular projection plane in which at least one of a radius of a projection plane, a front-back length of a ship, a side length of a ship, a side ratio of a ship, and an inclination of a projection plane is adjustable by a user input.

5. The method of claim 1, wherein each of the plurality of actual cameras is installed with a posture inclined at an angle of 0 to 90 degrees relative to a direction perpendicular to the ground plane of the world coordinate system, and
   the generated SVM image displays a horizon in at least a portion thereof.

6. The method of claim 1, wherein at least one of the plurality of actual cameras is a blind-view camera installed to photograph a blind sector located below a waist of a spindle-shaped ship, and
   the generating of the SVM image comprises generating the SVM image based on the conversion relationship between the blind-view camera and the virtual camera.

7. The method of claim 1, wherein
   two or more of the plurality of actual cameras have different installation heights and different installation postures.

8. The method of claim 1, further comprising providing a user interface for displaying and adjusting the SVM image and the virtual camera,
   wherein the user interface allows adjustment of display settings of the SVM image according to a user input.

9. The method of claim 8, wherein the display settings of the SVM image, which are adjustable according to the user input, comprise a location, and yaw, pitch, roll, and scale settings of the SVM image, and
   the SVM image is changed in real time as the display settings are adjusted.

10. The method of claim 1, further comprising providing a calibration adjustment interface for adjusting the conversion relationship between the virtual camera and each of the plurality of actual cameras,
    wherein a pre-stored conversion relationship between the virtual camera and each of the plurality of actual cameras is reset through the calibration adjustment interface based on a user input.

11. The method of claim 1, further comprising:
    obtaining one or more point clouds by transmitting a signal to a surrounding area of the ship and receiving a reflected signal using a light detection and ranging (LiDAR) sensor;
    generating, in real time, a 3-dimensional (3D) projection plane having an irregular shape for the surrounding area of the ship, set using the installation information of each of the plurality of the actual cameras and depth information of an object obtained by the LiDAR sensor; and
    performing image fusion by projecting images of the plurality of cameras from a viewpoint of the virtual camera located on a top of the ship.

12. The method of claim 11, further comprising dynamically updating the 3D projection plane based on artificial intelligence or the depth information of the object obtained by the LiDAR sensor.

13. An apparatus for generating and applying a surround view monitoring (SVM) image, the apparatus comprising:
    a plurality of actual cameras provided on a ship and configured to photograph a surrounding area of the ship, wherein at least two actual cameras of the plurality of actual cameras have different installation heights and generates non-overlapping images; and
    a processor configured to:

obtain installation information of the plurality of actual cameras;

set a virtual camera orient toward a ground plane perpendicularly within a world coordinate system;

calculate a conversion relationship between the virtual camera and each of the plurality of actual cameras, based on the installation information;

generate the SVM image based on the conversion relationship; and control the ship based on the generated SVM image;

wherein the conversion relationship is calculated based on a distance points in an image acquired from each of the plurality of actual cameras, wherein the distance is generated based on the installation information comprising an installation location, an installation height, and an installation posture.

14. The apparatus of claim 13, wherein the processor is further configured to:

determine a 3-dimensional (3D) projection plane based on a shape of the ship or the installation heights of the plurality of actual cameras; and generate the SVM image by projecting the images onto the 3D projection plane.

15. The apparatus of claim 14, wherein the 3D projection plane has an elliptical hemisphere form or a hemispherical form with a semicylinder inserted at a center thereof.

16. The apparatus of claim 14, wherein the 3D projection plane is an irregular projection plane in which at least one of a radius of a projection plane, a front-back length of a ship, a side length of a ship, a side ratio of a ship, and an inclination of a projection plane is adjustable by a user input.

17. The apparatus of claim 13, wherein each of the plurality of actual cameras is installed with a posture inclined at an angle of 0 to 90 degrees relative to a direction perpendicular to the ground plane of the world coordinate system, and the generated SVM image displays a horizon in at least a portion thereof.

18. The apparatus of claim 13, wherein the processor is further configured to provide a calibration adjustment interface for adjusting a conversion relationship between the virtual camera and the plurality of actual cameras.

19. The apparatus of claim 13, wherein the plurality of actual cameras comprises a blind-view camera installed to photograph a blind sector located below a waist of a spindle-shaped ship, and the processor is further configured to generate the SVM image based on a conversion relationship between the blind-view camera and the virtual camera.

* * * * *